United States Patent [19]

Hansen

[11] Patent Number: 4,712,445
[45] Date of Patent: Dec. 15, 1987

[54] ADJUSTING MECHANISM FOR TRACTOR LINKAGE

[75] Inventor: Charles A. Hansen, Troy, Mich.

[73] Assignee: Ford Motor Company, Dearborn, Mich.

[21] Appl. No.: 866,623

[22] Filed: May 23, 1986

[51] Int. Cl.⁴ .................. G05G 1/00; F16D 57/10
[52] U.S. Cl. ........................... 74/491; 74/545; 74/581; 192/8 R
[58] Field of Search ............... 74/491, 498, 496, 545, 74/581, 582; 192/8 R

[56] References Cited

U.S. PATENT DOCUMENTS

| | | | |
|---|---|---|---|
| 1,708,616 | 4/1929 | Grimm | 192/8 R |
| 2,665,904 | 1/1954 | Lehmann | 74/545 |
| 2,920,500 | 1/1960 | Edman | 74/491 |
| 2,971,619 | 2/1961 | Koslo | 74/545 |
| 3,102,619 | 9/1963 | Tiedemann | 192/8 R |
| 3,108,669 | 10/1963 | Ateliani | 192/8 R |

Primary Examiner—Richard J. Scanlan, Jr.
Assistant Examiner—Peter M. Cuomo
Attorney, Agent, or Firm—Daniel M. Stock; Clifford L. Sadler

[57] ABSTRACT

An adjusting device for a tractor trailing hitch link provides for adjusting telescoping link from within the cab of the tractor through a shaft connection and permits locking the telescoping link in its adjusted position while isolating the shaft connection from forces imposed on the trailing hitch link.

4 Claims, 10 Drawing Figures

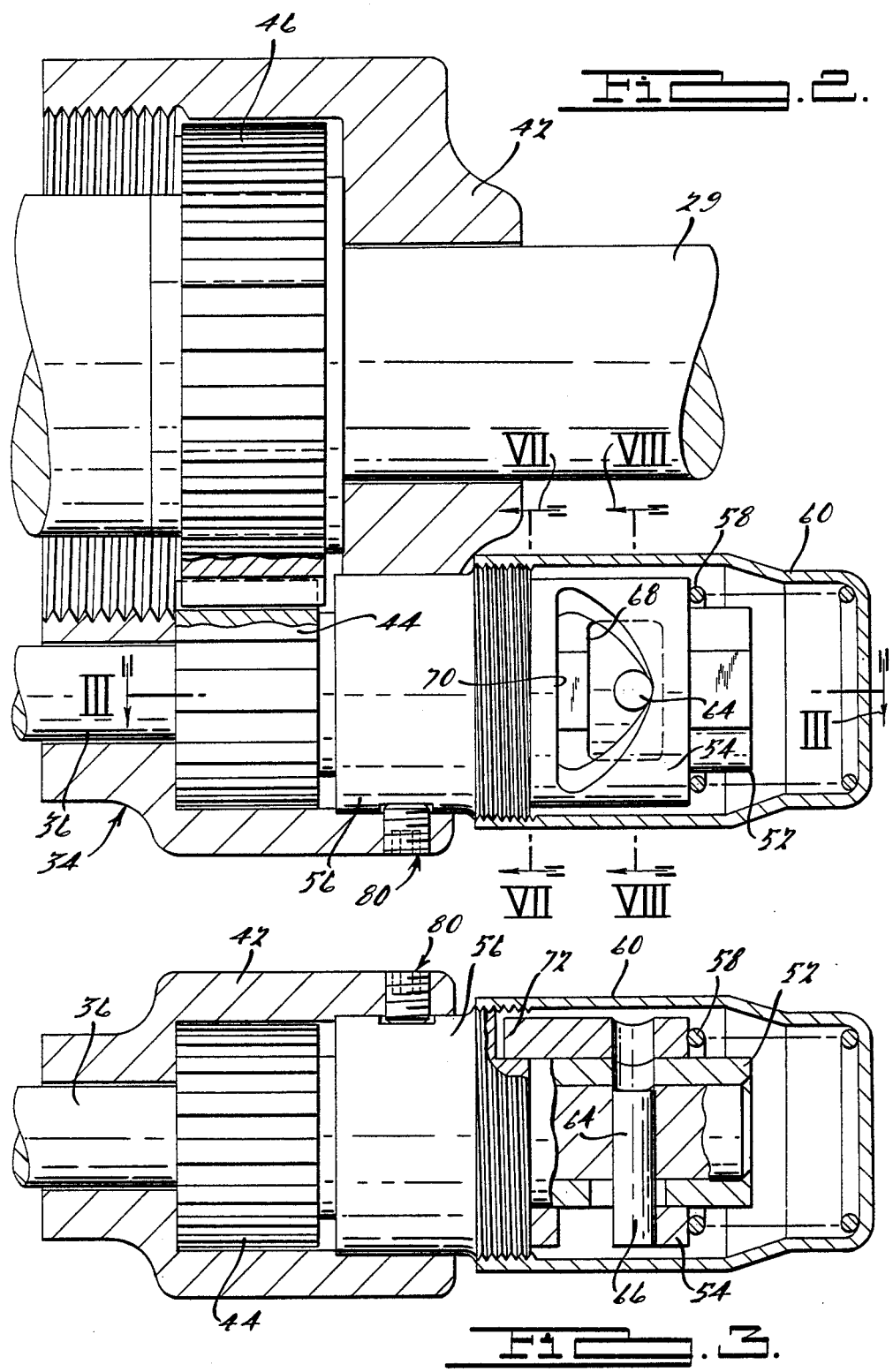

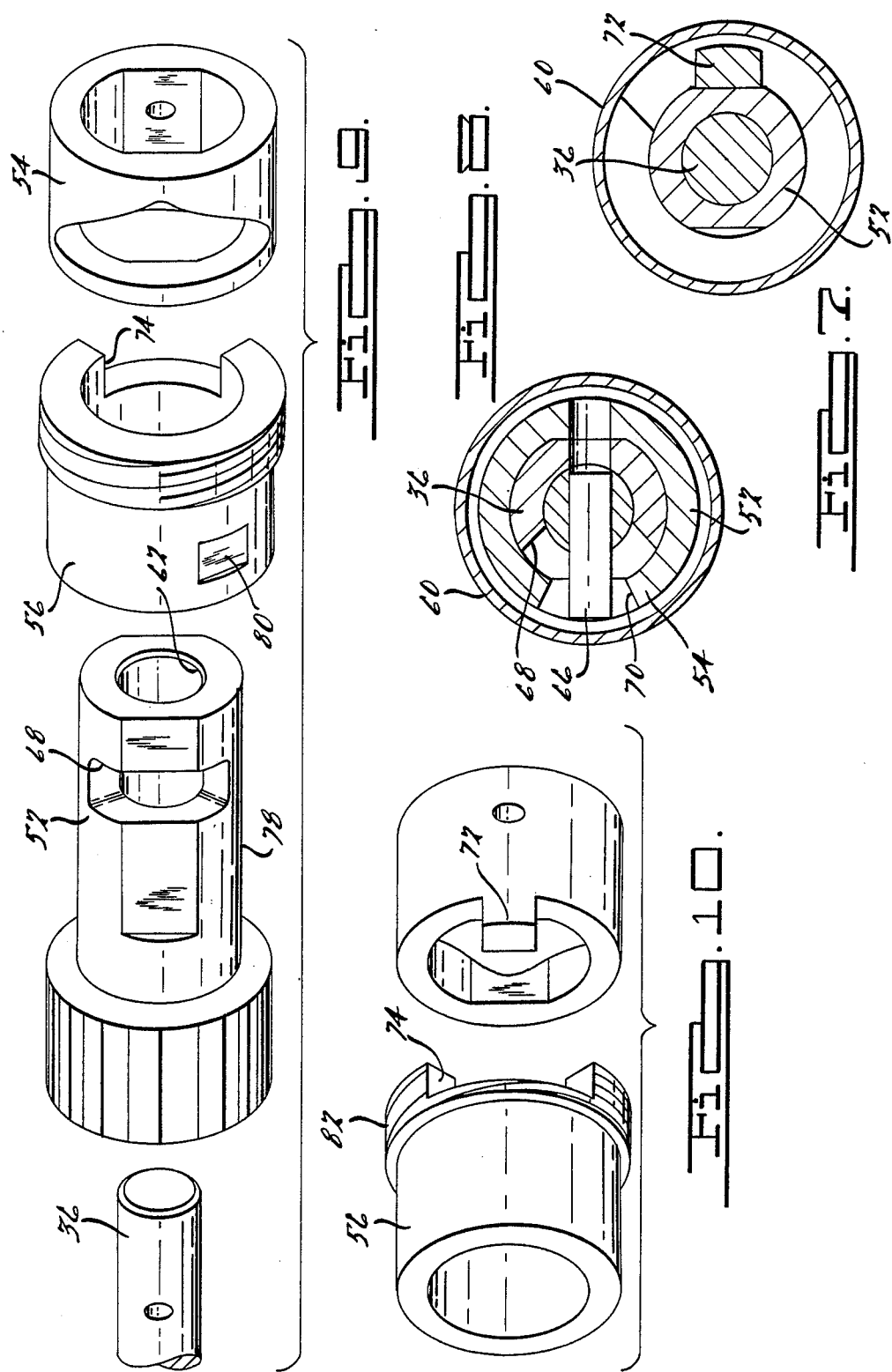

ADJUSTING MECHANISM FOR TRACTOR LINKAGE

BACKGROUND OF THE INVENTION

1. Field of the Invention

The present invention relates generally to leveling devices for tractor hitch linkages and more specifically to locking and adjusting attachments for such mechanisms.

2. Description of the Prior Art

In the trailing arm implement hitch link systems generally used with modern agricultural tractors it is customary to provide a telescoping link mechanism by which the basic attitude of the trailing arm link may be adjusted according to the desires of the use of the tractor, responsive to varying soil and other use conditions. With the advent of enclosed cab constructions in modern agricultural tractors it has become desireable to provide means for the farmer to effect this adjustment in the attitude of his trailing linkage without leaving the cab. Such in-cab adjustment controls generally comprise a handle or crank mounted within the cab and connected through shafting having appropriate degrees of freedom to accommodate movements of the trailing hitch linkage with respect to the cab. The shafting generally serves as an input to some sort of a gear drive mechanism for running a telescoping link upwardly and downwardly to pivotally move the trailing hitch link of the tractor. Since during agricultural use in working soil, such as in plowing, significant loads are imposed upon the outboard end of the trailing link tending to move it away from the position to which it is adjusted. It has been found desireable to lock the adjusting mechanisms in their final adjusted position. When the adjustment device input member, i.e., the crank or hand wheel, is mounted in the tractor cab, attempts have been made to effect this lock by positioning a mechanical lock at the wheel or crank. Unfortunately this has been found to be less than satisfactory because the loads transferred back up the linkage from the tractor trailing hitch link are extremely high so that the durability of the hand wheel and operative shafting to which it is attached has been less than optimal.

SUMMARY OF THE INVENTION

Responsive to the deficiencies in the prior art to adjusting mechanisms the present invention provides an adjusting mechansim in which remote adjustment of a pivotally mounted tractor hitch linkage is provided in which locking of the adjustment mechanism is effected in the power transfer mechanism through which telescoping movements to pivotally move the linkages is accomplished.

According to another feature of the invention the locking and unlocking actuation of the power transfer device is accomplished automatically as a part of the adjusting procedure.

BRIEF DESCRIPTION OF THE DRAWING

These and other features will become apparent to those skilled in the art of agricultural tractor linkages upon reading the following specification with reference to the attached drawing in which:

FIG. 2 is a longitudinal cross-sectional view of the invention adjustment mechanism taken along line 2—2 of FIG. 1.

FIG. 3 is a cross-sectional view taken along line 3—3 of FIG. 2.

FIG. 7 is a cross-sectional view taken along line 7—7 of FIG. 2.

FIG. 8 is a cross-sectional view taken along line 8—8 of FIG. 2.

FIG. 9 is an exploded perspective view of operative portions of the adjusting mechanism of the present invention.

FIG. 10 is an exploded perspective view of the reverse side of portions of FIG. 9.

DESCRIPTION OF THE PREFERRED EMBODIMENT

Figure 1:
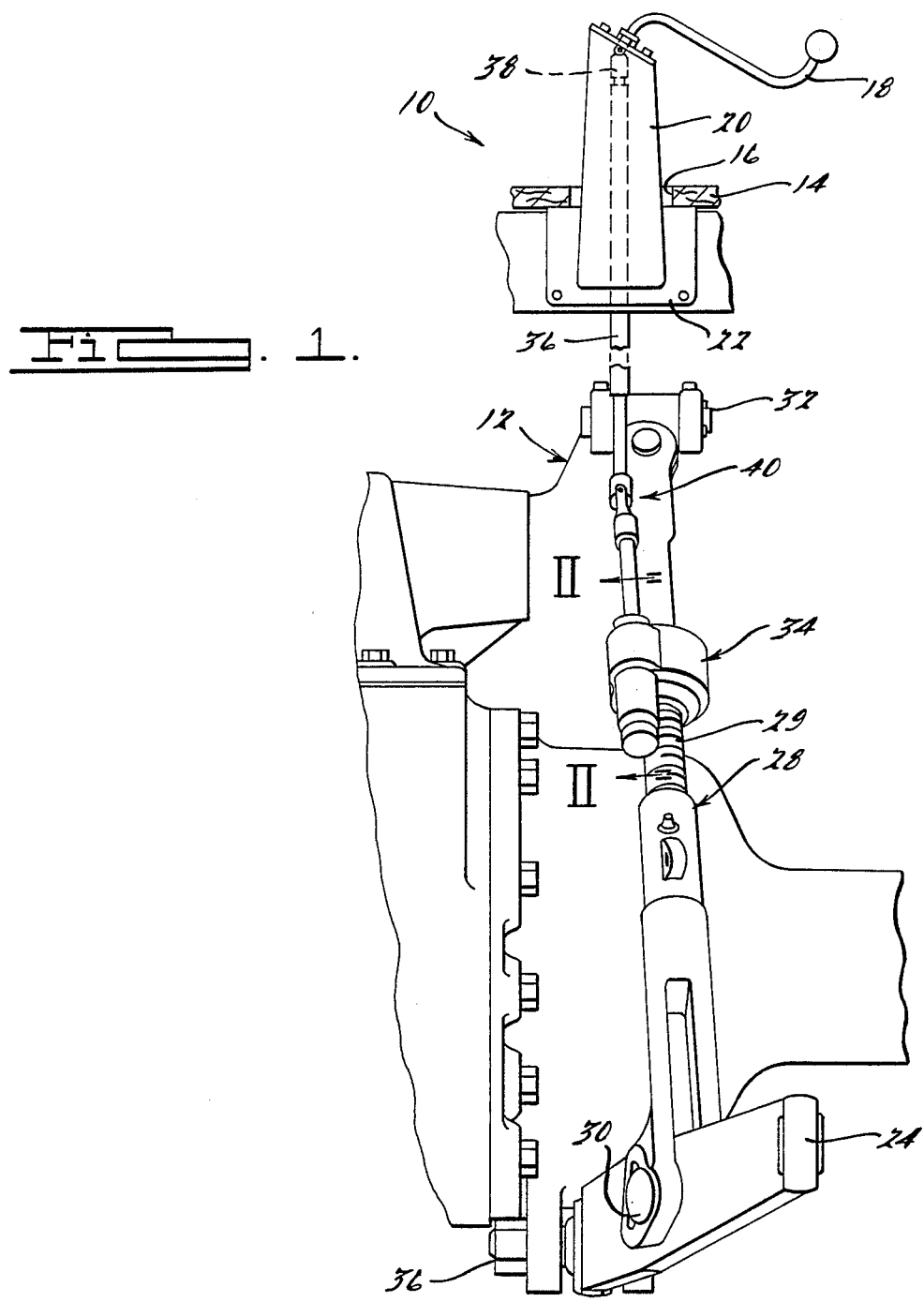
FIG. 1 is a rear elevation view of a portion of an agricultural tractor including the adjusting mechanism of the present invention, certain parts shown diaphragmatically for clarity.

Turning now to the drawing, in particular to FIG. 1, portions of an agricultural tractor are shown, including a body portion indicated generally at 10 and a frame portion indicated generally at 12. The body portion 10, which is conventionally mounted on the frame, includes a cab wall 14 having a aperture 16 formed through it for receiving a crank mechanism indicated generally at 18. The crank mechanism 18 may include a housing 20 inserted through the aperture 16 and a mounting assembly indicated at 22 for securing the housing 20 to the cab of the tractor. The frame portion 12 is illustrated as including a lift link mechanism 24 pivotally attached in known manner to the frame 12 as indicated at 26 adjacent a lower surface of the frame 12. Interposed between the lift link 24 and an upper surface of the frame 12 is a telescoping link mechanism indicated generally at 28. Such telescoping linkages are well known in the art and specific description of them is considered unnecessary. Insofar as it relates to the present invention it is sufficient to note that the telescoping linkage generally includes a pivotable connection at 30 to the lift link 24 and at 32 to the upper portion of the frame and that it generally includes a gear driven adjusting screw mechanism indicated at 34 which will subsequently be described in more detail as it operatively cooperates with the present invention. The adjusting crank 18 and the telescoping link 28 are interconnected by shafting indicated generally at 36. The shafting 36 may include flexible links as shown at 38 and 40 to accommodate movement of the telescoping link 28 with respect to the tractor cab during use.

Turning now to FIG. 2 with reference to the perspectives of FIGS. 9 and 10 for better appreciation, it is illustrated that the gear driven adjusting screw mechanism 34 of the telescoping link 28 includes a housing 42 for receiving a gear train comprising gears 44, 46 arrange for driving a shaft 29 the telescoping adjustment link 28 with mechanical advantage from the input of the adjusting shaft 36. Unlike prior art the adjusting mechanisms, however, in which fast connection of the shaft 36 with respect to the gear 44 would provide the adjusting load input to the telescoping shaft 48, the present invention provides an automatic locking and unlocking adjusting mechanism indicated generally at 50 which provides for isolation of the shaft 36 and hence, the adjusting crank 18 from loads imposed on the telescoping shaft 28 by operation of lift link 24. The locking and unlocking device 50 as can be seen in FIGS. 2 and 9 consists essentially of shaft 36, a geared shaft member 52, a locking collar 54, a mounting collar 56, a spring member 58 and a cover member 60. The shaft 36 is slidingly insertable through an axial bore 62 formed in the geared shaft member 52 and includes a cross-bore 64 for receiving a pin 66 which has one end portion 68 extending radially outwardly from the shaft 36 through a generally rectangular slot 68 formed in the gear shaft member 52 and a generally triangularly shaped slot 70 formed through the wall of the locking collar 54. The locking collar 54 includes an axially projecting dog portion 72 insertable in the circumferentially extending slot portion 74 of the mounting collar 56. It will be noted that the spring 58 interposed between the locking collar 54 and the housing 60 urges the locking collar in a direction toward the mounting collar 56 since the locking collar 54 includes a smooth inner diameter, indicated at 76, for sliding insertion over the outer diameter 78 of the geared shaft member 52. The mounting collar 56 is held fast in the housing 42 by conventional means such as slot engagement with a set screw as indicated at 80. The provision of the outer threaded portion 82 on mounting collar 56 permits threaded engagement with the housing 60 to protect the adjusting mechanism from contamination during use.

OPERATION OF THE PREFERRED EMBODIMENT

The locking collar 54, axially moveable on the geared shaft member 52 under influence of the crosspin 66 carried with the input shaft 36, defines a lost motion mechanism operative to permit adjustments of the position of the lift link 24 from within a tractor cab while isolating the manual adjustment mechanism or crank 18 mounted in the tractor cab from the forces imposed on the lift link 24 during use.

In FIGS. 2 and 3 the locking and unlocking mechanism 50 is illustrated in the position the parts assume absent the rotary input from the shaft 36. That is the position the parts assume at rest. This is a locked-up position in which the force exerted by the spring 58 urges the locking collar 54 towards the mounting collar 56. When the dog 72 of locking collar 54 is in registration with the circumferencially running slot 74 of the mounting collar 56, dog and slot engage as best be seen in FIG. 3. In the locked condition, loads imposed on the shaft 29 by motion of the lift link 24 which may tend to rotate the meshed gears 46, 44 will be resisted by the interaction of dog 72 and slot 74, since movement of the gear 44 serves to move the rectangular slot 68 with respect to the pin 66 as shown in FIG. 2; but such movement is limited by the length of the slot 74 such that the torque load imposed by the telescoping shaft 48 is directed into the housing 42 through the shaft 52; the pin 66, the locking collar 54 and the mounting collar 56 at the interface between the dog 72 and slot 74. No load is transferred through sides of the slot 68 to the geared shaft 52 since the lengths of slots 68, 70 and 74 are chosen to prevent this load transfer in the locked condition.

Figure 4:
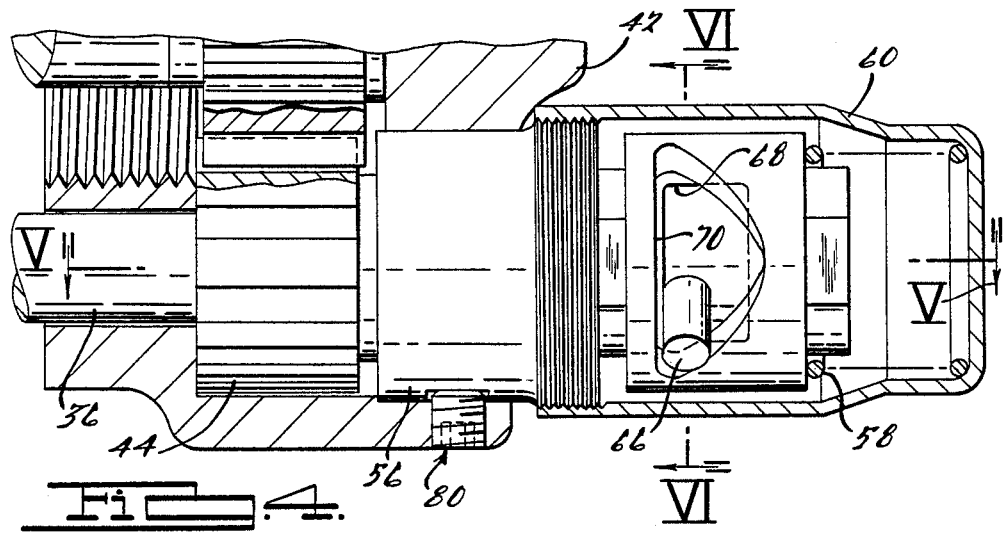
FIG. 4 is a cross-sectional view similar to FIG. 2 showing the invention mechanism in the position assumed during adjustment.
Figure 5:
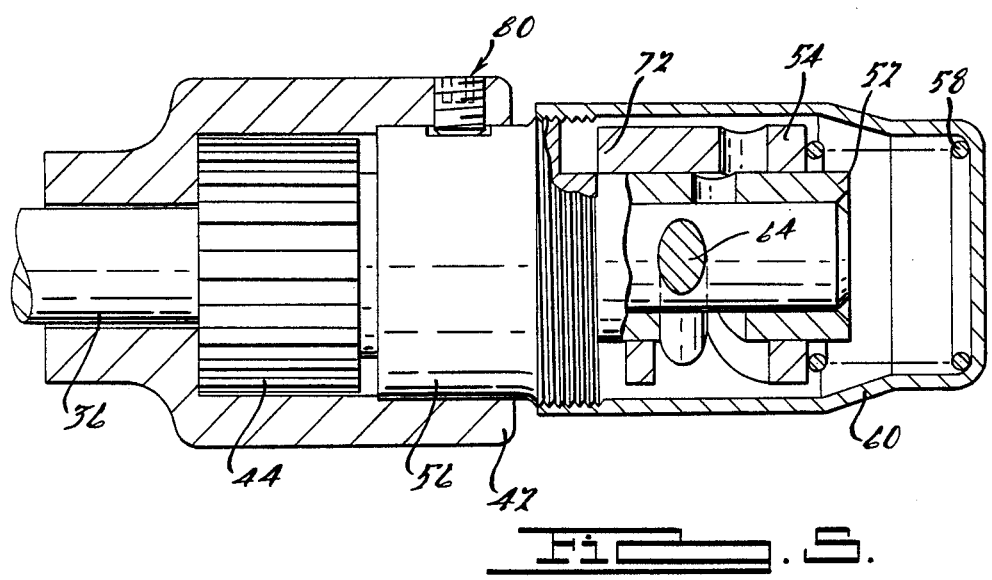
FIG. 5 is a cross-sectional view taken along line 5—5 of FIG. 4.
Figure 6:
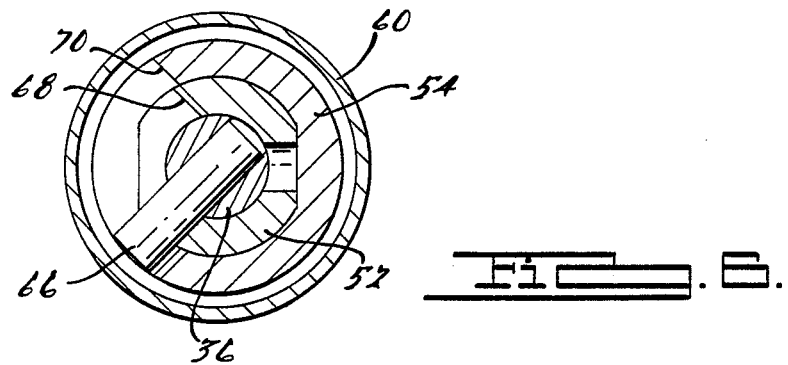
FIG. 6 is a cross-sectional view taken along line 6—6 of FIG. 4.

Adjusting movements of the locking and unlocking adjusting mechanism 50 can best be appreciated by reference to FIGS. 4 and 5 in which it is indicated that upon rotation of the input shaft 36, the pin 66 bears against the edge of the triangularly shaped slot 70 to ramp the locking collar 54 against force of spring 58 to move the dog 72 out of engagement with the slot 74. Pin 66 also engages an edge of the rectangular slot 68 to drive the geared shaft member 52 and hence the gear train 44, 46 to move the telescoping shaft 29. After adjustment is complete release of the handle 18 will permit the parts to tend to return to the position shown in FIG. 2 since the spring 58 urges the locking collar 54 toward the mounting collar 56, thus, ramping the pin 66 along the edge of the triangular slot 70. If the dog 72 is not in registration with slot 74 after such release of the handle, the mechanism will stay in the unlocked condition until some slight rotation feedback to the input shaft 36 where upon registration is effected and the parts will assume the locked condition illustrated in FIG. 2.

While only one embodiment to the invention locking and unlocking adjusting device has been disclosed others may be possible without departing from the scope of the appended claims. For example, the mounting collar shown as cooperating with the locking collar and the preferred embodiment can clearly be replaced by a slotted housing that would cooperate with a dogged locking collar. Other part simplifications and reversals may also occur to those skilled in the agricultural tractor arts.

What is claimed is:

1. In an agricultural tractor of the type having a frame, a tractor cab mounted on the frame, a trailing arm hitch link pivotally mounted on a portion of the frame and a telescoping link assembly mounted on portions of the frame and the trailing link and having a drive gear carried in a housing for effecting telescoping movement to pivotally adjust the trailing link an improved adjusting mechanism comprising:
   crank means mounted in the tractor cab;
   shaft means rotatively driven by the crank means; and
   locking and unlocking adjusting means carried in the drive gear housing in driving relationship with the drive gear and engaged with the shaft means to be rotatable with the shaft means in response to rotation of the crank means, portions of the adjusting means being arranged in a locked position to prevent more than certain limited movement of the drive gear in response to movement of the trailing link, and including lost motion means for permitting driving movement of the drive gear upon certain rotation of the shaft means by moving the adjusting means portions to an unlocked position permitting such movement.

2. In an agricultural tractor of the type having a frame, a cab mounted on the frame, a trailing arm hitch link pivotally mounted on a portion of the frame and a telescoping link assembly mounted on portions of the frame and the trailing link and having a drive gear carried in a housing for effecting telescoping movement to pivotally adjust the trailing link an improved adjusting mechanism comprising:
   crank means mounted in the tractor cab;
   shaft means rotatively driven by the crank means; and
   a locking and unlocking mechanism carried in the drive gear housing of the telescoping link assembly and including:

a geared shaft carried in meshing engagement with the drive gear and carried for rotation with the shaft means;

means defining a mounting collar carried in fixed relationship with the housing, surrounding the geared shaft, and having an annular end surface with a circumferentially extending locking slot formed therein;

a locking collar axially slidably carried on the geared shaft and having an axially extending dog portion at one end insertable into the locking slot to effect rotative driving engagement therebetween;

means biasing the locking collar toward the mounting collar;

drive pin means operative to rotate the geared shaft and the locking collar in response to rotation of the shaft means; and slot means formed radially through aligned walls of the geared shaft and the locking collar to effect a lost motion connection between the shaft means and the drive gear whereby rotation of the shaft means effects axial movement of the locking collar against the biasing means to effect disengagement of the dog from the locking slot.

3. An improved adjusting mechanism as defined in claim 2 wherein the slot means comprises a first generally rectangular slot formed through a circumferential wall of the geared shaft and a second, generally triangular slot formed through a circumferential wall of the locking collar, diverging sides of the second slot engageable by the drive pin to effect the locking collar axial movement.

4. An improved adjusting mechanism as defined in claim 3 wherein the circumferential lengths of the first and second slots are limited such that rotative movement of the locking collar dog portion through the circumferential extent of the locking slot is insufficient to drivingly engage the drive pin means against the geared shaft.

* * * * *